(12) United States Patent
Ito et al.

(10) Patent No.: US 8,715,762 B2
(45) Date of Patent: May 6, 2014

(54) FOOD COMPOSITION

(75) Inventors: Shoichi Ito, Osaka (JP); Kanae Arima, Osaka (JP)

(73) Assignee: House Foods Corporation, Higashiosaka-shi (JP)

( * ) Notice: Subject to any disclaimer, the term of this patent is extended or adjusted under 35 U.S.C. 154(b) by 745 days.

(21) Appl. No.: 12/458,628

(22) Filed: Jul. 17, 2009

(65) Prior Publication Data

US 2010/0015318 A1   Jan. 21, 2010

(30) Foreign Application Priority Data

Jul. 18, 2008  (JP) ................................. 2008-187625
Jun. 19, 2009  (JP) ................................. 2009-146639

(51) Int. Cl.
*A23L 1/05* (2006.01)
*A23L 1/31* (2006.01)
*A23J 3/00* (2006.01)

(52) U.S. Cl.
CPC .... *A23L 1/05* (2013.01); *A23L 1/31* (2013.01); *A23J 3/00* (2013.01)
USPC .......................................... 426/573; 426/574

(58) Field of Classification Search
USPC ................................. 426/574, 573
See application file for complete search history.

(56) References Cited

U.S. PATENT DOCUMENTS

| | | | |
|---|---|---|---|
| 4,789,664 A * | 12/1988 | Seligson et al. | 514/23 |
| 4,876,103 A | 10/1989 | Kawano et al. | |
| 4,876,203 A * | 10/1989 | Guigan | 436/45 |
| 5,498,435 A | 3/1996 | Hosoda et al. | |
| 2005/0129834 A1* | 6/2005 | Yamaku et al. | 426/637 |

FOREIGN PATENT DOCUMENTS

| | | |
|---|---|---|
| JP | 62-55052 A | 3/1987 |
| JP | 62-259550 A | 11/1987 |
| JP | 63-71158 A | 3/1988 |
| JP | 63-196238 A | 8/1988 |
| JP | 2-410 A | 1/1990 |
| JP | 4-94664 A | 3/1992 |
| JP | 6-315356 A | 11/1994 |
| JP | 7-79640 B2 | 8/1995 |
| JP | 09154528 A * | 6/1997 |
| JP | 3222439 B2 | 8/2001 |
| JP | 2001-327265 A | 11/2001 |
| JP | 3637852 B2 | 1/2005 |

OTHER PUBLICATIONS

Office Action issued Jul. 30, 2013, in Japanese Patent Application No. 2009-146639.

* cited by examiner

*Primary Examiner* — Jyoti Chawla
(74) *Attorney, Agent, or Firm* — Birch, Stewart, Kolasch & Birch LLP

(57) ABSTRACT

This invention provides a substitute meat material that has no particular taste and can be readily controlled in terms of the protein amount and energy, and is therefore appropriate for use in food for kidney disease patients.

This invention relates to a food composition, which is prepared with a mixture containing a konjac raw material in a hydrated and swollen state, water-insoluble dietary fibers in an amount corresponding to 4 to 40 parts by weight (dry weight base) relative to 1 part by weight (dry weight base) of glucomannan in the konjac raw material, and an alkaline coagulant.

21 Claims, 21 Drawing Sheets
(17 of 21 Drawing Sheet(s) Filed in Color)

Example 1

Example 4

Konjak powder : insoluble dietary fiber
1 : 6

Example 2

Electron microscopic observation image
(500-fold magnification)

Example 13

Electron microscopic observation image
(500-fold magnification)

Example 14

Electron microscopic observation image
(500-fold magnification)

FOOD COMPOSITION

CLAIM OF PRIORITY

The present application claims priority from Japanese applications JP 2008-187625 filed on Jul. 18, 2008, and JP 2009-146639 filed on Jun. 19, 2009, the contents of which are hereby incorporated by reference into this application.

BACKGROUND OF THE INVENTION

1. Field of the Invention

The present invention provides a food composition having meat-like texture, which can be used as a substitute for protein food materials such as meat.

2. Background Art

Among existing food materials for substituting meat (substitute meat), products comprising vegetable proteins such as soybean proteins are mainly used. The protein contents in substitute meat products comprising vegetable proteins are comparable to those of meat materials. In addition, soybean proteins have particular taste that is different from those of animal proteins. Therefore, in order to obtain meat substitute products, it is necessary to make attempts to flavor a food product comprising soybean proteins.

Meanwhile, it is necessary for kidney disease patients to eat low protein food. Also, it is necessary for metabolic syndrome or diabetes patients to eat low-energy food. Kidney disease patients undergo strict protein intake restriction. In addition, it is necessary for them to gain sufficient energy from meals. Advanced kidney disease patients need to receive dialysis treatment, which is highly expensive. For such reason, the early detection and treatment of kidney diseases have been promoted nationwide. In view of the above, it is predicted that the number of patients under dietary restriction will steadily increase. For such various types of food, substitute meat materials having no particular taste that can be readily controlled in terms of protein amount and energy have been awaited.

JP Patent No. 3222439 B (Patent Document 1) discloses a processed minced meat product containing flaked mannan gel, fat or oil, saccharide, and minced meat (15% to 40%). JP Patent Publication (Kokoku) No. 7-79640 B (1995) (Patent Document 2) discloses a processed meat food product prepared with konjac. JP Patent Publication (Kokai) No. 2001-327265 A (Patent Document 3) discloses a processed beef product containing ι (iota)-carrageenan. In the case of techniques disclosed in the above documents, it is necessary to add meat, which is a protein source, and this results in failures to achieve significant reduction in protein intake.

Konjac is a well-known low-calorie food material. A variety of food materials containing konjac mannan gel have been developed. JP Patent No. 3637852 B (Patent Document 4) discloses a method for producing a konjac food that comprises: partially swelling a konjac raw material containing konjac glucomannan with an aqueous solution containing a polysaccharide comprising three or more monosaccharide units, selected from the group consisting of dextrine, indigestible dextrine, starch, soluble starch, and pectine in a manner such that konjac glucomannan particles remain in the material; and solidifying the material with the addition of an alkaline agent. JP Patent Publication (Kokai) No. 4-94664 A (1992) (Patent Document 5) discloses a method for producing a dried food material which comprises: kneading a product obtained by swelling a purified konjac powder with water, a cellulose-starch complex, and gelatinized starch; carrying out alkali treatment and heat treatment to obtain gel products; coupling the products; and drying the resultant. JP Patent Publication (Kokai) No. 62-259550 A (1987) (Patent Document 6) discloses a dried gel mainly consisting of starch and konjac mannan. JP Patent Publication (Kokai) No. 62-55052 A (1987) (Patent Document 7) discloses a method for producing dried konjac that comprises a konjac production step of adding starch and the like to konjac root or konjac mannan, kneading the resulting product, and allowing the product to gel by a conventional method. However, all techniques disclosed in Patent Documents 4 to 7 are intended to modify a konjac food or provide a boiled-rice-like food material. Therefore, it is impossible to produce meat substitute by the above methods.

SUMMARY OF THE INVENTION

Problem to be Solved by the Invention

It is an object of the present invention to provide a food composition having meat-like texture. In addition, it is another object of the present invention to provide a substitute meat material that has no particular taste and can be readily controlled in terms of the protein amount and energy, and is therefore appropriate for use in food for kidney disease patients, dietary food, and the like and.

Means for Solving Problem

The present inventors have found that a food composition, which is prepared by mixing a konjac raw material in a hydrated and swollen state, water-insoluble dietary fibers in an amount greater than that of the konjac raw material, and an alkaline coagulant, can be readily controlled in terms of the protein amount and energy and has no particular taste, and is therefore useful as a substitute meat composition. This has led to the completion of the present invention. The present invention encompasses the following inventions.

(1) A food composition, which is prepared with a mixture containing a konjac raw material in a hydrated and swollen state, water-insoluble dietary fibers in an amount corresponding to 4 to 40 parts by weight (dry weight base) relative to 1 part by weight (dry weight base) of glucomannan in the konjac raw material, and an alkaline coagulant.

(2) The food composition according to (1), in which the mixture contains water in an amount corresponding to 10 to 1000 parts by weight relative to 1 part by weight (dry weight base) of glucomannan in the konjac raw material.

(3) The food composition according to (1), in which the mixture further contains starch.

(4) The food composition according to (1), in which the mixture further contains fat or oil.

(5) The food composition according to (1), which is shaped into a particle form, spherical form, string form, or plate form.

(6) The food composition according to (1), which is prepared by heating the mixture, freezing the mixture, drying the mixture, or treating the mixture with at least two of the ways of treating the mixture described above.

(7) The food composition according to (6), which is prepared by drying the mixture and reconstituting the obtained dried product with water.

(8) The food composition according to (1), in which the protein content is 10 g or less per 100 g.

(9) The food composition according to (7), in which the protein content is 10 g or less per 100 g.

(10) A food for kidney disease patients, which contains the food composition according to (1).

(11) A food for kidney disease patients, which contains the food composition according to (7).
(12) A method for producing a food composition, comprising the step of forming a mixture containing a konjac raw material in a hydrated and swollen state, water-insoluble dietary fibers in an amount corresponding to 4 to 40 parts by weight (dry weight base) relative to 1 part by weight (dry weight base) of glucomannan in the konjac raw material, and an alkaline coagulant.
(13) The method according to (12), wherein the mixture contains water in an amount corresponding to 10 to 1000 parts by weight relative to 1 part by weight (dry weight base) of glucomannan in the konjac raw material.
(14) The method according to (12), further comprising the step of shaping the food composition into a particle form, spherical form, string form, or plate form.
(15) The method according to (12), further comprising at least one step selected from among the step of heating the mixture, the step of freezing the mixture, and the step of drying the mixture.
(16) The method according to (15), comprising the step of drying the mixture and further comprising the step of reconstituting the dried product obtained in the previous step with water.
(17) The method according to (16), wherein the step of reconstitution with water is a step of immersing the dried product in warm water, a step of boiling the dried product in water, or a step of steaming the dried product with water vapor.

Effects of the Invention

The food composition of the present invention has meat-like texture and can be readily controlled in terms of protein amount and energy. The food composition of the present invention has no particular taste and thus it can be readily seasoned. Therefore, the food of the present invention is useful as a food for kidney disease patients who must undergo protein intake restriction and as a meat substitute used for low-calorie food.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DESCRIPTION OF THE PREFERRED EMBODIMENTS

1. Konjac Raw Material

Figure 1:
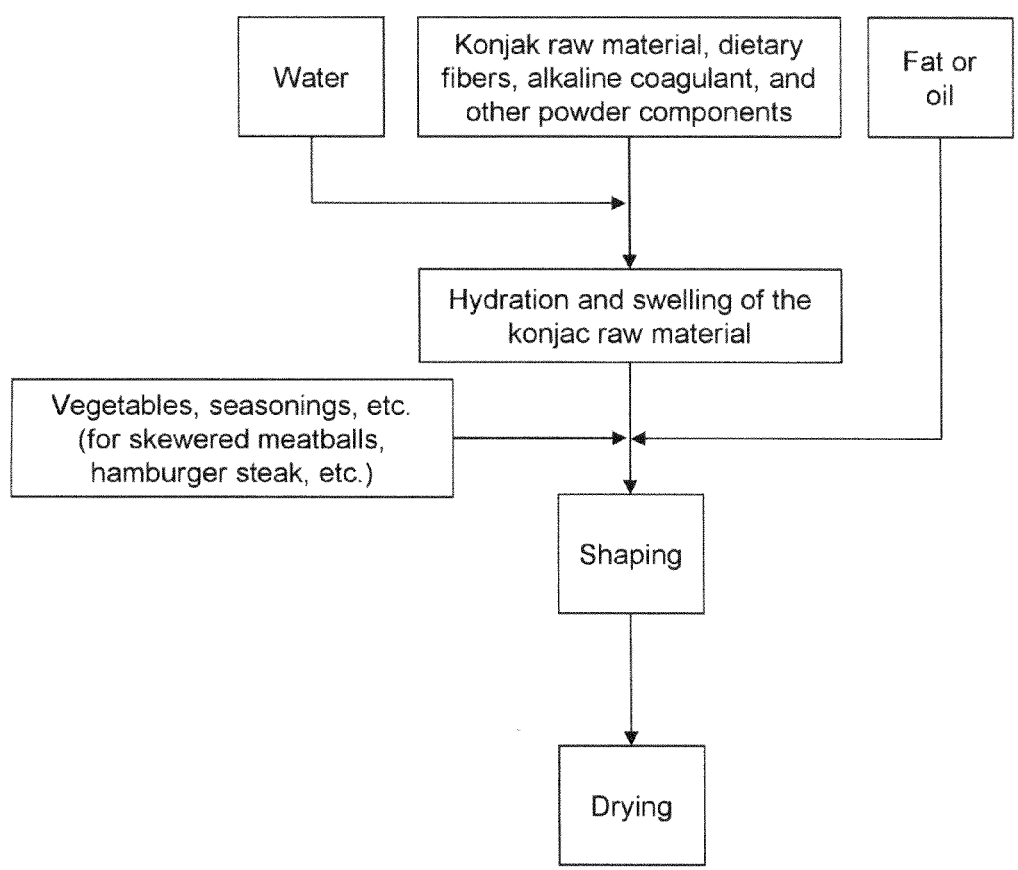
FIG. 1 shows a step of preparing the food composition of the present invention.

A konjac raw material used in the present invention is not particularly limited as long as it contains konjac root-derived glucomannan. Such materials in various forms with different purities can be used. Specific examples thereof include konjac powders, konjac root extracts, and glucomannan.

2. Water-Insoluble Dietary Fibers

The use of water-insoluble dietary fibers is important for imparting meat-like physical properties to a composition. In the present invention, it is preferable to use at least one type of water-insoluble dietary fibers selected from the group consisting of cellulose, hemicellulose, water-insoluble seaweed polysaccharides, water-insoluble pectic substances, chitin, chitosan, and lignin. Alternatively, a mixture containing the at least one water-insoluble dietary fibers can be preferably used. The degree of purification is not particularly limited. In addition to crystalline cellulose and the like having high purities, water-insoluble dietary fibers such as wheat fibers, carrot pulp, and apple pulp having low purities can be used. Water-insoluble dietary fibers can be used in the form of a powder comprising water-insoluble dietary fibers or a powder comprising a complex containing water-insoluble dietary fibers and a thickener (e.g., starch). Preferably, water-insoluble dietary fibers can be used in the form of a mixture of such two different powders. It is desirable to use water-insoluble dietary fibers in the powder form. Desirably, the particle size of the powder is a size at which powder particles can pass through 1000-μm mesh openings (preferably a size at which powder particles can pass through 500-μm mesh openings).

3. Composition Ratio of Water or Water-Insoluble Dietary Fibers to a Konjac Raw Material A substitute meat composition can be produced only when the composition ratio of water-insoluble dietary fibers to a konjac raw material is determined to fall within a preferable range. Specifically, the amount of water-insoluble dietary fibers corresponds to 4 to 40 parts by weight (dry weight base), preferably 6 to 17 parts by weight (dry weight base), and further preferably 11 to 14 parts by weight (dry weight base) relative to 1 part by weight (dry weight base) of glucomannan in a konjac raw material to be used. If the composition ratio of water-insoluble dietary fibers to a konjac raw material does not fall within the above range, it becomes difficult to attain meat-like physical properties.

The amount of water for hydrating and swelling a konjac raw material corresponds to preferably 10 to 1000 parts by weight, more preferably 20 to 60 parts by weight, and most preferably 25 to 48 parts by weight relative to 1 part by weight (dry weight base) of glucomannan in a konjac raw material to be used.

4. Alkaline Coagulant

In the present invention, an alkaline coagulant is used for allowing konjac-derived glucomannan to gel. Specific examples of an alkaline coagulant include calcium hydroxide. A generally used alkaline coagulant can be arbitrarily used. The amount of an alkaline coagulant is determined to correspond to 0.001 to 10 parts by weight and preferably 0.01 to 0.1 parts by weight relative to 1 part by weight (dry weight base) of glucomannan in a konjac raw material.

5. Other Components

The present invention has been made based on a surprising finding that a food composition that is prepared by allowing a mixture containing predetermined amounts of a konjac raw material in a hydrated and swollen state and water-insoluble dietary fibers to gel with the use of an alkaline coagulant has meat-like physical properties. Therefore, it is possible to add a different food material that can be combined with a substitute meat material to such a mixture. Examples of a different food material to be added include fat or oil, starch, vegetables, fruits, spices, and seasonings. In a case in which a final product is not intended to be provided as a low-protein food, livestock meat, seafood meat, eggs, soybeans, or a processed food containing such ingredients may be added. With the addition of fat or oil, physical properties (texture of melting fat in the mouth, meat juice texture, etc.) and taste particular to livestock meat can be given to the food composition. The type of fat or oil used herein is not limited. The amount of fat or oil added is preferably 1 to 30 parts by weight relative to 1 part by weight of glucomannan in the konjac raw material (dry weight base). With the addition of starch, texture (meat juice texture) particular to livestock meat can be imparted to the food composition. Further, in a case in which the food composition is prepared by heating the mixture, starch gelatinization takes place upon heating such that effects of improving shape retention properties of the food composition can be achieved. The type of starch used herein is not limited. Examples thereof include potato starch, tapioca starch, wheat starch, ocarina starch, kudzu starch, rice starch, bean starch, and corn starch (e.g., corn starch, waxy corn starch, or high amylose corn starch). It is also possible to use a variety of processed starches such as oxidized starch, gelatinized starch, and processed starch, which are derived from any of the above examples. Starch may be used in the cereal powder form such as rice powder, wheat powder, corn powder, or rice cake powder. Different types of starches may be used in combination. Preferably, the amount of starch added corresponds to 1 to 10 parts by weight relative to 1 part by weight (dry weight base) of glucomannan in the konjac raw material.

6. Preparation of Food Compositions

The food composition of the present invention is prepared with a mixture containing predetermined amounts of a konjac raw material in a hydrated and swollen state, water-insoluble dietary fibers, and an alkaline coagulant.

An alkaline coagulant acts on a konjac raw material in a hydrated and swollen state so as to promote gelling of the konjac raw material in a mixture containing a konjac raw material in a hydrated and swollen state, water-insoluble dietary fibers in an amount corresponding to 4 to 40 parts by weight (dry weight base) relative to 1 part by weight (dry weight base) of glucomannan in the konjac raw material, and an alkaline coagulant. Therefore, a gel product having fresh meat-like physical properties and maintaining its shape to an appropriate extent (such gel product is referred to as "dough-like paste" or "dough-like mixture" in the present invention in some cases) can be obtained by mixing a konjac raw material in a hydrated and swollen state, water-insoluble dietary fibers, and an alkaline coagulant.

A food composition in the form appropriate for edible use can be obtained by using a dough-like mixture in an appropriately gelling state that is obtained by mixing a konjac raw material in a hydrated and swollen state, water-insoluble dietary fibers, and an alkaline coagulant. Alternatively, such a food composition can be obtained by adequately shaping the above mixture according to need and carrying out various treatments involving heating, freezing, drying, and the like. The gel strength is further improved by heating the dough-like mixture or by freezing or drying the dough-like mixture followed by heating. Accordingly, a food composition having physical properties similar to those of a heat treated processed meat product can be obtained.

When the above mixture is subjected to heat treatment, heating in hot water, deep frying in oil, frying with oil, baking, steaming, microwave heating, hot-air heating, or the like can be carried out as in the case of treatment for usual processed meat products. The above treatments may be used in combination. In a case in which the dough-like mixture is heated in hot water, it is preferable to place the mixture in a container in order to maintain the shape, immerse the container in hot water, and heat the container.

A freezing treatment that is generally carried out for processed meat food can be used as a treatment for freezing the mixture. The frozen mixture can be heated in the manner described above for eating.

A treatment for drying the mixture can be carried out by a method involving freeze drying, hot-air drying, or the like. Both of freeze drying and hot-air drying are preferable for producing a dried product of a minced meat substitute. Freeze drying is preferable for producing a dried product of a processed meat substitute in the form of meatballs, hamburger steak, skewered meatballs, or the like.

The food composition of the present invention that is obtained by carrying out the drying step can be eaten after being reconstituted with water. Examples of the step of reconstitution with water include a step of immersing a dried food composition in warm water (reconstitution in hot water), a step of boiling the composition in water, and a step of steaming the composition with water vapor.

FIG. 1 shows steps of preparing the food composition of the present invention in one preferred embodiment. In the steps, water, a konjac raw material, water-insoluble dietary fibers, an alkaline coagulant, and a different powder component (starch, baking soda, etc) that is added according to need are mixed by stirring. If necessary, the mixture is allowed to stand for 30 minutes or more for hydration and swelling of the konjac raw material. Next, components such as fat or oil, vegetables, and spices are added thereto according to need, followed by mixing. Then, the resultant is formed into a desired shape. Thus, the gel food composition of the present invention is obtained. As in Example 2 or the like, the resultant may be dried at the end. Gelling of glucomannan caused by an alkaline coagulant slowly proceeds. Therefore, as shown in FIG. 1, even when an alkaline coagulant is previously added to a mixture before hydration and swelling of a konjac raw material, gelling proceeds at a rate slower than the rate at which hydration and swelling proceeds. Accordingly, gelling is completed after formation of a mixture of a konjac raw material in a hydrated and swollen state and water-insoluble dietary fibers. Preferably, an alkaline coagulant is added together with water, a konjac raw material, and water-insoluble dietary fibers. However, the present invention is not limited to such example. An alkaline coagulant may be added after a konjac raw material becomes sufficiently hydrated and swollen.

The food composition can be shaped depending on the purposes. For instance, when it is shaped into a particle form, spherical form, string form, or plate form, a minced meat substitute or a substitute for processed meat products such as meatballs, hamburger steak, and skewered meatballs can be obtained.

7. Food Composition for Kidney Disease Patients

The food composition or drying food composition of the present invention can be used for food with a low protein content for kidney disease patients. The protein content in the food for kidney disease patients of the present invention is preferably 10 g or less, more preferably 5 g or less, and most preferably 0.5 g or less relative to the total weight of the food (100 g). According to standards of low-protein food used as food for special dietary use, a product with a protein content of 30% or less relative to that of a usual similar type food can be labeled as low-protein food (the protein content in 100 g of livestock meat is approximately 20 g). In addition, in accordance with the Health Promotion Law (Japan), when the protein content is less than 0.5 g relative to 100 g of a food product, the product can be labeled as containing 0 g of protein. In the case of the food composition of the present invention, both of the above requirements can be achieved. In addition, the fat or oil content in food for kidney disease patients can be controlled to a level at which kidney disease patients can maintain adequate calorie intake by controlling, for example, the amount of fat or oil to be added. In addition, it is also possible to provide a food composition with the ingredient amounts equivalent to those of the above food composition, which is used for food other than food for kidney disease patients.

8. Retort Food

The food composition of the present invention can be provided as a retort food by placing the composition into a container and carrying out retort sterilization treatment.

The present invention is hereafter described in greater detail with reference to the following examples, although the technical scope of the present invention is not limited thereto.

EXAMPLES

In tables, each composition content value corresponds to the mass content of a material relative to the total mass content of all raw materials (excluding seasonings and spices) (100%), and each of the values in brackets corresponds to the mass ratio of a material relative to the mass ratio of glucomannan (1).

Example 1

Example of Composition Containing no Fat and Oil

Glucomannan: Insoluble Dietary Fiber=1:11

Composition

TABLE 1

| Component | Composition content % (mass ratio) |
|---|---|
| (A) Insoluble dietary fiber (Product name: KC FLOCK W-200G (Nippon Paper Chemicals)* and CEOLUS RC-N81 (Asahi Kasei Chemicals Corporation)**) | 25.9% (11) |
| (B) Glucomannan (Product name: RHEOLEX RS (Shimizu Chemical Corporation)***) | 2.1% (1) |
| (C) Calcium hydroxide | 0.06% (0.03) |
| (D) Processed starch (Product name: FARINEX LCF (Matsutani Chemical Industry Co., Ltd.)) | 7.1% (3) |
| (F) Water | 64.84% (31) |
| Seasoning | Small content |
| Spice | Small content |

*Particle size of KC FLOCK W-200G (cellulose powder): 200 mesh pass (90% or more)
**Granulated material containing fine crystalline cellulose and karaya gum (fine crystalline cellulose: 80%; karaya gum: 10%; and dextrin: 10%); Average particle size of CEOLUS RC-N81: 8 to 10 μm; Particle size of fine crystalline cellulose particle: 0.2 μm
***Konjac root extract; Particle size of RHEOLEX: Complete pass (opening: 177 μm)

Production Procedures

Powders (A), (B), (C), and (D), seasonings, spices, and water (F) were mixed for approximately 30 minutes for swelling glucomannan. In addition, (C) was allowed to act on the mixture such that a dough-like paste was prepared. The product was extruded by a mincer via a 2-mm mesh opening screen such that each piece thereof was shaped to have a length of approximately 0.5 to 2 cm. The resulting product was heated in boiling water (100° C. for 5 minutes).

Property Evaluation

The obtained product was found to have properties described below when eaten immediately after produced.

Figure 2:
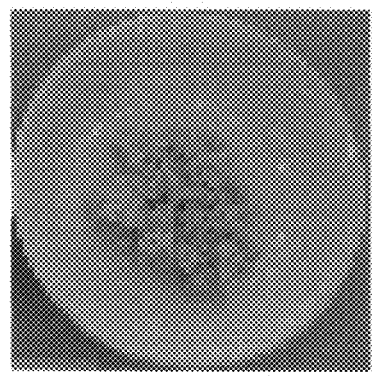
FIG. 2 is a photograph of substitute minced meat in Example 1.

Appearance: The form and the color of the product were similar to those of minced livestock meat (see FIG. 2).

Texture: The obtained product had muscle fiber-like fibrous texture particular to livestock meat and softness.

The product had no unusual taste or smell.

The above substitute minced meat (100 g) contained 0.1 g of protein.

In addition, the product obtained by extruding the dough-like paste produced above by a mincer had fresh minced meat-like properties. The fresh minced meat-like product extruded by a mincer was rolled into meatballs (for skewered meatballs) and the meatballs were cooked in a pot and eaten. They were found to have meat quality and texture similar to those of skewered meatballs made of livestock meat.

Example 2

Glucomannan: Insoluble Dietary Fiber=1:11

Composition

TABLE 2

| Component | Composition content % (mass ratio) |
|---|---|
| (A) Insoluble dietary fiber (KC FLOCK W-200G and CEOLUS RC-N81) | 16.8% (11) |
| (B) Glucomannan (RHEOLEX RS) | 1.4% (1) |
| (C) Calcium hydroxide | 0.04% (0.03) |
| (D) Processed starch (FARINEX LCF) | 4.6% (3) |
| (E) Lard | 18.3% (13) |
| (F) Water | 58.86% (42) |
| Seasoning | Small content |
| Spice | Small content |

Production Procedures

Powders (A), (B), (C), and (D), seasonings, spices, and water (F) were mixed for approximately 30 minutes for swelling glucomannan. In addition, (C) was allowed to act on the mixture such that a dough-like paste was prepared. Then, (E) was added thereto and mixed together. The product was extruded by a mincer via a 2-mm mesh opening screen such that each piece thereof was shaped to have a length of approximately 0.5 to 2 cm. The resulting product was freeze-dried with a vacuum freeze dryer. Accordingly, a substitute minced meat dried product was obtained. Drying conditions included a drying time of 18 hours, a cold trap temperature of −40° C. or less, a degree of vacuum of 0.1 torr or less, and a tray temperature of 50° C.

Property Evaluation

The obtained product had properties described below when cooked for reconstitution in hot water (100° C. for 10 minutes) and eaten.

Figure 3:
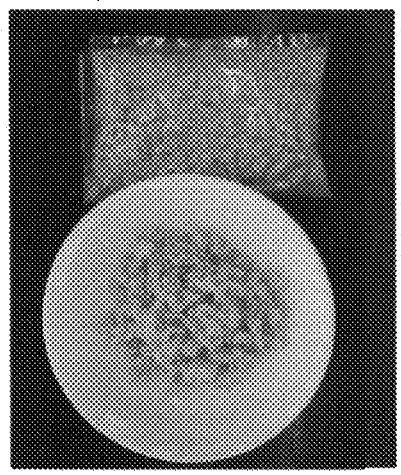
FIG. 3 is a photograph showing a substitute minced meat dried product (in a package) obtained in Example 2 and the product subjected to reconstitution in hot water (on a dish).

Appearance: The form and the color of the product were similar to those of minced livestock meat (see FIG. 3).

Texture: The product had muscle fiber-like fibrous texture particular to livestock meat, hardness, and elasticity.

The product had meat-like taste but no unusual taste or smell.

Figure 19:
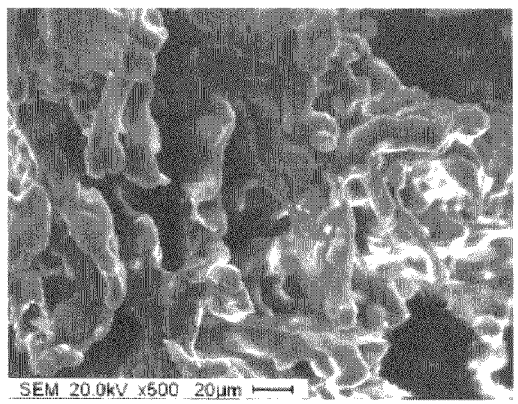
FIG. 19 is an electron microscopic observation image (500-fold magnification) of a cross section obtained by slicing substitute minced meat (in a dried state) obtained in Example 2.

The above substitute minced meat (in a dried state) (weight: 100 g) contained 0.2 g of protein and 40 g of fat. In addition, FIG. 19 shows an electron microscopic observation image (500-fold magnification) of a cross section obtained by slicing the substitute minced meat (in a dried state). In the image, insoluble dietary fibers are found to be covered with glucomannan. This is thought to contribute to realization of meat-like properties.

After reconstitution in hot water, the weight increased by approximately 3 times (to a level equivalent to the weight obtained before freeze drying).

In addition, the product obtained by extruding the dough-like paste produced above by a mincer had fresh minced meat-like properties.

Comparative Example 1

Glucomannan: Insoluble Dietary Fiber=1:1

Composition

TABLE 3

| Component | Composition content % (mass ratio) |
|---|---|
| (A) Insoluble dietary fiber (KC FLOCK W-200G and CEOLUS RC-N81) | 3.3% (1) |
| (B) Glucomannan (RHEOLEX RS) | 2.9% (1) |
| (C) Calcium hydroxide | 0.08% (0.03) |
| (D) Processed starch (FARINEX LCF) | 9.7% (3) |
| (E) Lard | 38.6% (13) |
| (F) Water | 45.42% (16) |
| Seasoning | Small content |
| Spice | Small content |

Production Procedures

Comparative example 1 was carried out as in Example 2.

Property Evaluation

The obtained product had properties described below when eaten as in Example 2.

Figure 14:
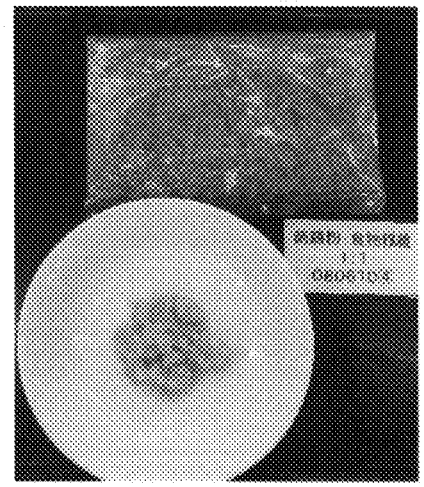
FIG. 14 is a photograph showing a dried product having the composition in Comparative Example 1 (in a package) and the product subjected to reconstitution in hot water (on a dish).

Appearance: The product was in a granule-like form and each piece thereof had a length shorter than that in the case of usual minced meat (see FIG. 14).

Texture: The product surface was soft and sticky. The product had elasticity similar to that of konjac.

The above substitute minced meat (in a dried state) (weight: 100 g) contained 0.2 g of protein and 58 g of fat.

After reconstitution in hot water, the weight increased approximately twice.

Comparative Example 2

Glucomannan: Insoluble Dietary Fiber=1:2

Composition

TABLE 4

| Component | Composition content % (mass ratio) |
|---|---|
| (A) Insoluble dietary fiber (KC FLOCK W-200G and CEOLUS RC-N81) | 6.2% (2) |
| (B) Glucomannan (RHEOLEX RS) | 2.7% (1) |
| (C) Calcium hydroxide | 0.08% (0.03) |
| (D) Processed starch (FARINEX LCF) | 9% (3) |
| (E) Lard | 36.1% (13) |
| (F) Water | 45.92% (17) |
| Seasoning | Small content |
| Spice | Small content |

Production Procedures

Comparative example 2 was carried out as in Example 2.

Property Evaluation

The obtained product had properties described below when eaten as in Example 2.

Figure 15:
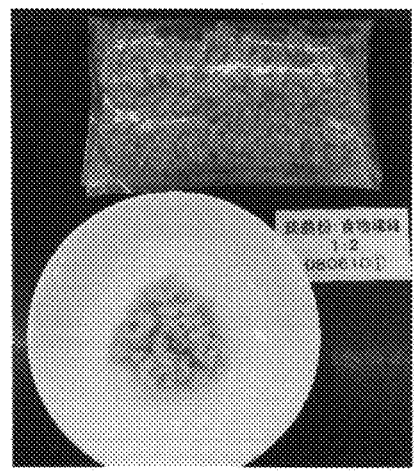
FIG. 15 is a photograph showing a dried product having the composition in Comparative Example 2 (in a package) and the product subjected to reconstitution in hot water (on a dish).

Appearance: The product was in the form of minced chicken meat but gave an appearance that was too translucent (see FIG. 15).

Texture: The product surface and the product cross-section surface were soft and sticky. The product had no fibrous texture.

The above substitute minced meat (in a dried state) (weight: 100 g) contained 0.2 g of protein and 55 g of fat.

After reconstitution in hot water, the weight increased by approximately 2.5 times.

Comparative Example 3

Glucomannan: Insoluble Dietary Fiber=1:3

Composition

TABLE 5

| Component | Composition content % (mass ratio) |
|---|---|
| (A) Insoluble dietary fiber (KC FLOCK W-200G and CEOLUS RC-N81) | 8.6% (3) |
| (B) Glucomannan (RHEOLEX RS) | 2.5% (1) |
| (C) Calcium hydroxide | 0.07% (0.03) |
| (D) Processed starch (FARINEX LCF) | 8.3% (3) |
| (E) Lard | 33.1% (13) |
| (F) Water | 47.43% (19) |
| Seasoning | Small content |
| Spice | Small content |

Production Procedures

Comparative example 3 was carried out as in Example 2.

Property Evaluation

The obtained product had properties described below when eaten as in Example 2.

Figure 16:
FIG. 16 is a photograph showing a dried product having the composition in Comparative Example 3 (in a package) and the product subjected to reconstitution in hot water (on a dish).

Appearance: The product was in the form of minced chicken meat but gave an appearance that was too translucent (see FIG. 16).

Texture: The product surface and the product cross-section surface were soft and sticky. The product had no fibrous texture.

The above substitute minced meat (in a dried state) (weight: 100 g) contained 0.2 g of protein and 52 g of fat.

After reconstitution in hot water, the weight increased by approximately 2.5 times Example 3

Glucomannan: Insoluble Dietary Fiber=1:4

Composition

TABLE 6

| Component | Composition content % (mass ratio) |
|---|---|
| (A) Insoluble dietary fiber (KC FLOCK W-200G and CEOLUS RC-N81) | 10.8% (4) |
| (B) Glucomannan (RHEOLEX RS) | 2.4% (1) |
| (C) Calcium hydroxide | 0.07% (0.03) |
| (D) Processed starch (FARINEX LCF) | 7.9% (3) |
| (E) Lard | 31.5% (13) |
| (F) Water | 47.33% (20) |
| Seasoning | Small content |
| Spice | Small content |

Production Procedures

Example 3 was carried out as in Example 2.

Property Evaluation

The obtained product had properties described below when eaten as in Example 2.

Figure 4:
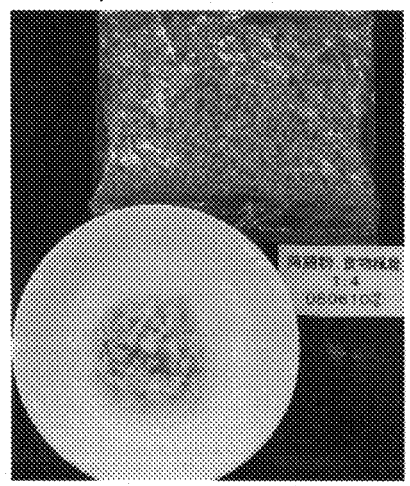
FIG. 4 is a photograph showing a substitute minced meat dried product (in a package) obtained in Example 3 and the product subjected to reconstitution in hot water (on a dish).

Appearance: The appearance of the product was similar to that of minced livestock meat (see FIG. 4).

Texture: The product had relatively soft muscle fiber-like fibrous texture that was similar to the texture of minced livestock meat.

The above substitute minced meat (in a dried state) (weight: 100 g) contained 0.2 g of protein and 50 g of fat.

After reconstitution in hot water, the weight increased by approximately 3 times.

Example 4

Glucomannan: Insoluble Dietary Fiber=1:6

Composition

TABLE 7

| Component | Composition content % (mass ratio) |
|---|---|
| (A) Insoluble dietary fiber (KC FLOCK W-200G and CEOLUS RC-N81) | 13.8% (6) |
| (B) Glucomannan (RHEOLEX RS) | 2% (1) |
| (C) Calcium hydroxide | 0.06% (0.03) |
| (D) Processed starch (FARINEX LCF) | 6.7% (3) |
| (E) Lard | 26.6% (13) |
| (F) Water | 50.84% (25) |
| Seasoning | Small content |
| Spice | Small content |

Production Procedures

Example 4 was carried out as in Example 2.

Property Evaluation

The obtained product had properties described below when eaten as in Example 2.

Figure 5:
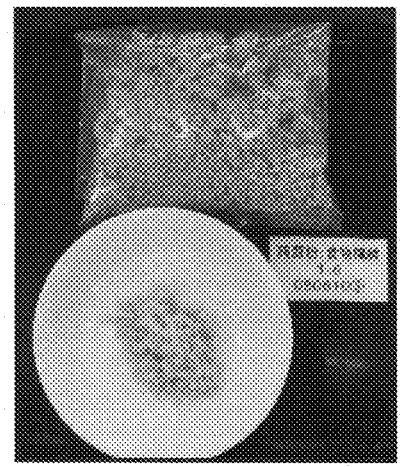
FIG. 5 is a photograph showing a substitute minced meat dried product (in a package) obtained in Example 4 and the product subjected to reconstitution in hot water (on a dish).

Appearance: The appearance of the product was similar to that of minced livestock meat (see FIG. 5).

Texture: The product had muscle fiber-like fibrous texture that was similar to the texture of minced livestock meat.

The above substitute minced meat (in a dried state) (weight: 100 g) contained 0.2 g of protein and 45 g of fat.

After reconstitution in hot water, the weight increased by approximately 3 times.

Example 5

Glucomannan: Insoluble Dietary Fiber=1:14

Composition

TABLE 8

| Component | Composition content % (mass ratio) |
|---|---|
| (A) Insoluble dietary fiber (KC FLOCK W-200G and CEOLUS RC-N81) | 19.4% (14) |
| (B) Glucomannan (RHEOLEX RS) | 1.3% (1) |
| (C) Calcium hydroxide | 0.04% (0.03) |
| (D) Processed starch (FARINEX LCF) | 4.4% (3) |
| (E) Lard | 17.7% (14) |
| (F) Water | 57.16% (44) |
| Seasoning | Small content |
| Spice | Small content |

Production Procedures

Example 5 was carried out as in Example 2.

Property Evaluation

The obtained product had properties described below when eaten as in Example 2.

Appearance: The appearance of the product was similar to that of minced livestock meat.

Texture: The product had relatively hard muscle fiber-like fibrous texture particular to livestock meat, hardness, and elasticity.

The product had meat-like taste but no unusual taste or smell.

The above substitute minced meat (in a dried state) (weight: 100 g) contained 0.2 g of protein and 35 g of fat.

After reconstitution in hot water, the weight increased by approximately 3 times.

Example 6

Glucomannan: Insoluble Dietary Fiber=1:17

Composition

TABLE 9

| Component | Composition content % (mass ratio) |
|---|---|
| (A) Insoluble dietary fiber (KC FLOCK W-200G and CEOLUS RC-N81) | 21.7% (17) |
| (B) Glucomannan (RHEOLEX RS) | 1.2% (1) |
| (C) Calcium hydroxide | 0.03% (0.03) |
| (D) Processed starch (FARINEX LCF) | 3.8% (3) |
| (E) Lard | 15.4% (13) |
| (F) Water | 57.87% (48) |
| Seasoning | Small content |
| Spice | Small content |

Production Procedures

Example 6 was carried out as in Example 2.

Property Evaluation

The obtained product had properties described below when eaten as in Example 2.

Appearance: The appearance of the product was similar to that of minced livestock meat.

Texture: The product had hard muscle fiber-like fibrous texture particular to livestock meat and was similar to minced livestock meat having firm chewing texture.

The above substitute minced meat (in a dried state) (weight: 100 g) contained 0.2 g of protein and 30 g of fat.

After reconstitution in hot water, the weight increased by approximately 3 times.

Example 7

Glucomannan: Insoluble Dietary Fiber=1:22

Composition

TABLE 10

| Component | Composition content % (mass ratio) |
|---|---|
| (A) Insoluble dietary fiber (KC FLOCK W-200G and CEOLUS RC-N81) | 23.9% (22) |
| (B) Glucomannan (RHEOLEX RS) | 1% (1) |
| (C) Calcium hydroxide | 0.03% (0.03) |
| (D) Processed starch (FARINEX LCF) | 3.3% (3) |
| (E) Lard | 13% (13) |
| (F) Water | 58.77% (59) |
| Seasoning | Small content |
| Spice | Small content |

Production Procedures

Example 7 was carried out as in Example 2

Property Evaluation

The obtained product had properties described below when eaten as in Example 2.

Appearance: The appearance of the product was similar to that of minced livestock meat.

Texture: The product had hard and fibrous texture but still had meat-like texture. The product was found to have rough fibrous texture to a slight extent.

The above substitute minced meat (in a dried state) (weight: 100 g) contained 0.2 g of protein and 27 g of fat.

After reconstitution in hot water, the weight increased by approximately 3 times.

Example 8

Use of Other Insoluble Dietary Fibers

Composition

TABLE 11

| Component | Composition content % (mass ratio) |
|---|---|
| (A) Insoluble dietary fiber (KC FLOCK W-200G) | 16.8% (12) |
| (B) Glucomannan (RHEOLEX RS) | 1.4% (1) |
| (C) Calcium hydroxide | 0.04% (0.03) |
| (D) Processed starch (FARINEX LCF) | 4.6% (3) |
| (E) Lard | 18.3% (13) |
| (F) Water | 58.86% (42) |
| Seasoning | Small content |
| Spice | Small content |

Production Procedures

Example 8 was carried out as in Example 2.

Property Evaluation

The obtained product had properties described below when eaten as in Example 2.

Figure 6:
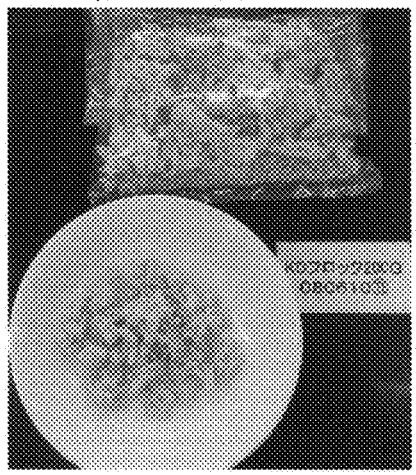
FIG. 6 is a photograph showing a substitute minced meat dried product (in a package) obtained in Example 8 and the product subjected to reconstitution in hot water (on a dish).

Appearance: The appearance of the product was similar to that of minced livestock meat (see FIG. 6).

Texture: The product had relatively hard and strong fibrous texture and also had firm chewing texture. The product was found to have fiber-derived rough texture to a slight extent. The product was similar to heat-cooked chicken minced meat having strong fibrous texture.

The above substitute minced meat (in a dried state) (weight: 100 g) contained 0.2 g of protein and 40 g of fat.

After reconstitution in hot water, the weight increased by approximately 3 times.

Example 9

Use of Other Insoluble Dietary Fibers

Composition

TABLE 12

| Component | Composition content % (mass ratio) |
| --- | --- |
| (A) Insoluble dietary fiber (Product name: KS-F4 (San-Ei Gen F.F.I., Inc.)*) | 16.8% (5) |
| (B) Glucomannan (RHEOLEX RS) | 1.4% (1) |
| (C) Calcium hydroxide | 0.04% (0.03) |
| (D) Processed starch (FARINEX LCF) | 4.6% (3) |
| (E) Lard | 18.3% (13) |
| (F) Water | 58.86% (42) |
| Seasoning | Small content |
| Spice | Small content |

*KS-F4 (San-Ei Gen F.F.I., Inc.) is a complex of starch and insoluble dietary fibers (starch content: 60%).

Production Procedures

Example 9 was carried out as in Example 2.

Property Evaluation

The obtained product had properties described below when eaten as in Example 2.

Figure 7:
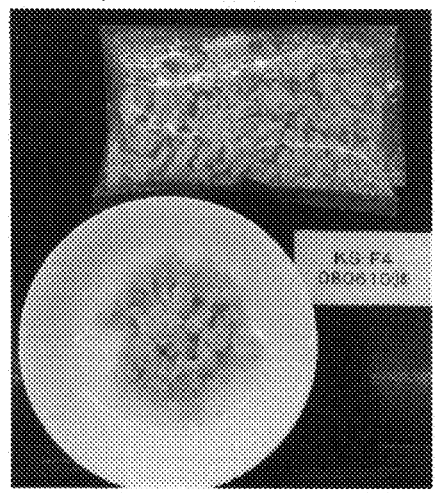
FIG. 7 is a photograph showing a substitute minced meat dried product (in a package) obtained in Example 9 and the product subjected to reconstitution in hot water (on a dish).

Appearance: The product gave a translucent appearance and the surface thereof was glossy. Therefore, the product was similar to uncooked chicken meat (see FIG. 7).

Texture: The product had soft texture and was similar to fatty meat. The product also had fibrous texture to some extent.

The above substitute minced meat (in a dried state) (weight: 100 g) contained 1 g of protein and 40 g of fat.

After reconstitution in hot water, the weight increased by approximately 4 times.

Example 10

Use of Other Insoluble Dietary Fibers

Composition

TABLE 13

| Component | Composition content % (mass ratio) |
| --- | --- |
| (A) Insoluble dietary fiber (Apple pulp (Nippon Del Monte Corporation)) | 40.1% (12) |
| (B) Glucomannan (RHEOLEX RS) | 2.3% (1) |
| (C) Calcium hydroxide | 0.07% (0.03) |
| (D) Processed starch (FARINEX LCF) | 7.7% (3) |
| (E) Lard | 30.6% (13) |
| (F) Water | 19.23% (8) |
| Seasoning | Small content |
| Spice | Small content |

Production Procedures

Example 10 was carried out as in Example 2.

Property Evaluation

The obtained product had properties described below when eaten as in Example 2.

Figure 8:
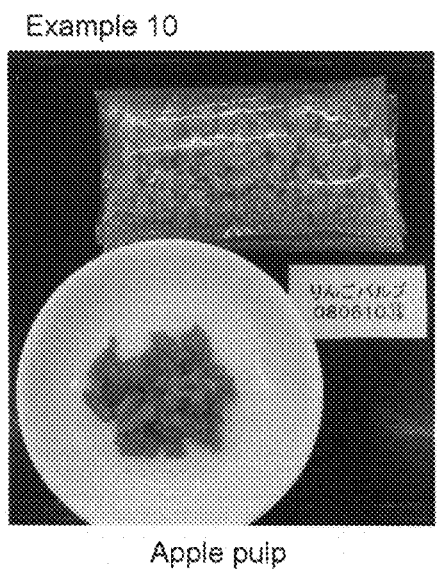
FIG. 8 is a photograph showing a substitute minced meat dried product (in a package) obtained in Example 10 and the product subjected to reconstitution in hot water (on a dish).

Appearance: The product had a translucent red-brown color. The tissue of the product was similar to that of minced meat (see FIG. 8).

Texture: The product had very soft texture and was similar to fatty meat. The product also had fibrous texture to some extent.

The above substitute minced meat (in a dried state) (weight: 100 g) contained 1 g of protein and 40 g of fat.

After reconstitution in hot water, the weight increased by approximately 3 times.

Example 11

Use of Other Insoluble Dietary Fibers

Composition

TABLE 14

| Component | Composition content % (mass ratio) |
| --- | --- |
| (A) Insoluble dietary fiber (Carrot pulp (Nippon Del Monte Corporation)) | 45.1% (13) |
| (B) Glucomannan (RHEOLEX RS) | 1.8% (1) |
| (C) Calcium hydroxide | 0.05% (0.03) |
| (D) Processed starch (FARINEX LCF) | 6.2% (3) |
| (E) Lard | 24.6% (14) |
| (F) Water | 22.25% (12) |
| Seasoning | Small content |
| Spice | Small content |

Production Procedures

Example 11 was carried out as in Example 2.

Property Evaluation

The obtained product had properties described below when eaten as in Example 2.

Figure 9:
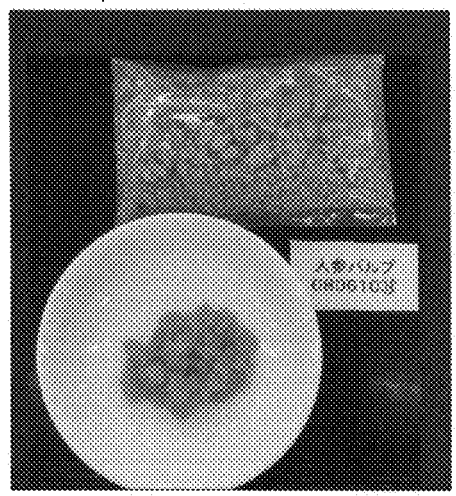
FIG. 9 is a photograph showing a substitute minced meat dried product (in a package) obtained in Example 11 and the product subjected to reconstitution in hot water (on a dish).

Appearance: The product had a carrot-like red color and gave an appearance that was relatively translucent. The tissue of the product was similar to that of minced meat (see FIG. 9).

Texture: The product had very soft meat texture and also had fibrous texture to some extent.

The above substitute minced meat (in a dried state) (weight: 100 g) contained 1 g of protein and 40 g of fat.

After reconstitution in hot water, the weight increased by approximately 3 times.

Example 12

Use of Other Insoluble Dietary Fibers

Composition

TABLE 15

| Component | Composition content % (mass ratio) |
| --- | --- |
| (A) Insoluble dietary fiber (Wheat fiber (SANSHO Co., Ltd.)) | 15.6% (12) |
| (B) Glucomannan (RHEOLEX RS) | 1.3% (1) |
| (C) Calcium hydroxide | 0.04% (0.03) |
| (D) Processed starch (FARINEX LCF) | 4.3% (3) |
| (E) Lard | 17% (13) |
| (F) Water | 61.76% (48) |
| Seasoning | Small content |
| Spice | Small content |

Production Procedures

Example 12 was carried out as in Example 2.

Property Evaluation

The obtained product had properties described below when eaten as in Example 2.

Figure 10:
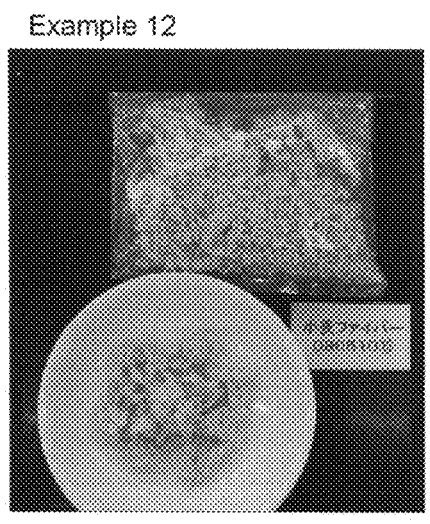
FIG. 10 is a photograph showing a substitute minced meat dried product (in a package) obtained in Example 12 and the product subjected to reconstitution in hot water (on a dish).

Appearance: The form and the color of the product were similar to those of minced livestock meat (see FIG. 10).

Texture: The product had relatively hard and strong fibrous texture that was meat-like texture.

The above substitute minced meat (in a dried state) (weight: 100 g) contained 1 g of protein and 40 g of fat.

After reconstitution in hot water, the weight increased by approximately 3 times.

Comparative Example 4

Use of Water-Soluble Dietary Fiber

Composition

TABLE 16

| Component | Composition content % (mass ratio) |
|---|---|
| (A) Water-soluble dietary fiber (Product name: Soyafibe S-DA100 (Fuji Oil Co., Ltd.)*) | 29.5% (20) |
| (B) Glucomannan (RHEOLEX RS) | 1.5% (1) |
| (C) Calcium hydroxide | 0.04% (0.03) |
| (D) Processed starch (FARINEX LCF) | 4.9% (3) |
| (E) Lard | 19.6% (13) |
| (F) Water | 44.46% (30) |
| Seasoning | Small content |
| Spice | Small content |

*Soybean dietary fiber

Production Procedures

Comparative Example 4 was carried out as in Example 2.

Property Evaluation

The obtained product had properties described below when eaten as in Example 2.

Figure 17:
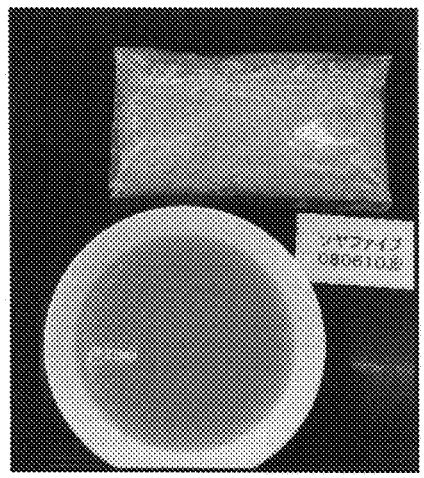
FIG. 17 is a photograph showing a dried product having the composition in Comparative Example 4 (in a package) and the product subjected to reconstitution in hot water (on a dish).

Appearance: The product was dissolved and did not retain its original form (see FIG. 17).

Comparative Example 5

Use of Water-Soluble Dietary Fiber

Composition

TABLE 17

| Component | Composition content % (mass ratio) |
|---|---|
| (A) Water-soluble dietary fiber (Sun Fiber R (Taiyo Kagaku Co., Ltd.)*) | 37.2% (22) |
| (B) Glucomannan (RHEOLEX RS) | 1.7% (1) |
| (C) Calcium hydroxide | 0.05% (0.03) |
| (D) Processed starch (FARINEX LCF) | 5.7% (3) |
| (E) Lard | 22.7% (13) |
| (F) Water | 32.65% (19) |
| Seasoning | Small content |
| Spice | Small content |

*Guar bean dietary fiber

Production Procedures

Comparative Example 5 was carried out as in Example 2.

Property Evaluation

The obtained product had properties described below when eaten as in Example 2.

Figure 18:
FIG. 18 is a photograph showing a dried product having the composition in Comparative Example 5 (in a package) and the product subjected to reconstitution in hot water (in a retort pouch).

Appearance: The product was dissolved and did not retain its original form. (See FIG. 18: FIG. 18 shows the product in a package subjected to reconstitution in hot water)

Example 13

Substitute Hamburger Steak Dried Product

Composition

TABLE 18

| Component | Composition content % (mass ratio) |
|---|---|
| (A) Insoluble dietary fiber (KC FLOCK W-200G and CEOLUS RC-N81) | 11.9% (8) |
| (B) Glucomannan (RHEOLEX RS) | 1.3% (1) |
| (C) Calcium hydroxide | 0.03% (0.02) |
| Cut onion | 28.5% (22) |
| Seasoning | Small content |
| Spice | Small content |
| (D) Processed starch (FARINEX LCF) | 3.2% (2) |
| (E) Lard | 12.9% (10) |
| (F) Water | 42.17% (32) |

Production Procedures

Powders (A), (B), (C), and (D), seasonings, spices, and water (F) were mixed for approximately 30 minutes for swelling konjac powder. In addition, (C) was allowed to act on the mixture such that a dough-like paste was prepared. Then, onion and (E) were added thereto and mixed together and shaped into a disk form. The product was freeze-dried with a vacuum freeze dryer. Accordingly, a substitute hamburger steak dried product was obtained. Drying conditions included a drying time of 18 hours, a cold trap temperature of −40° C. or less, a degree of vacuum of 0.1 torr or less, and a tray temperature of 50° C.

Property Evaluation

The obtained product had properties described below when cooked for reconstitution in hot water (100° C. for 10 minutes) and eaten.

Figure 11:
FIG. 11 is a photograph showing a substitute hamburger steak dried product (in a package) obtained in Example 13 and the product subjected to reconstitution in hot water (on a dish).

Appearance: The product was visually confirmed to contain many pieces of cut onion. The product gave an appearance that was similar to handmade-style hamburger steak (see FIG. 11).

Texture: The product had soft texture that was similar to the texture of handmade-style hamburger steak. The texture of the product was close to the texture of tofu hamburger steak.

The above substitute hamburger steak (in a dried state) (weight: 100 g) contained 1.3 g of protein and 40 g of fat.

Figure 20:
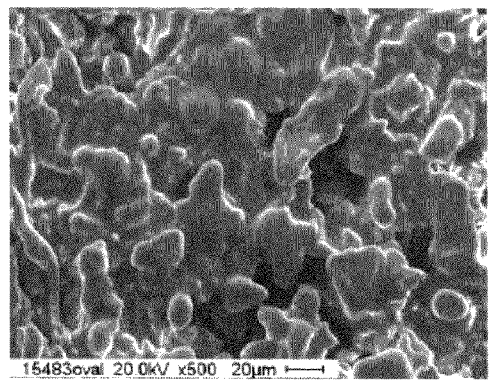
FIG. 20 is an electron microscopic observation image (500-fold magnification) of a cross section obtained by slicing a substitute hamburger steak dried product obtained in Example 13.

After reconstitution in hot water, the weight increased by approximately 3 times (to a level equivalent to the weight obtained before freeze drying). In addition FIG. 20 shows an electron microscopic observation image (500-fold magnification) of a cross section obtained by slicing the substitute hamburger steak dried product. In the image, insoluble dietary fibers are found to be covered with glucomannan. This is thought to contribute to realization of the hamburger steak-like properties described above.

Example 14

Substitute Chicken Meatball Dried Product

Composition

TABLE 19

| Component | Composition content % (mass ratio) |
|---|---|
| (A) Insoluble dietary fiber (KC FLOCK W-200G and CEOLUS RC-N81) | 10.9% (8) |
| (B) Glucomannan (RHEOLEX RS) | 1.2% (1) |

TABLE 19-continued

| Component | Composition content % (mass ratio) |
|---|---|
| (C) Calcium hydroxide | 0.03% (0.03) |
| Finely chopped ginger | 6.6% (6) |
| Finely chopped white scallion | 13.1% (11) |
| Finely chopped carrot | 15.1% (13) |
| Seasoning | Small content |
| Spice | Small content |
| (D) Processed starch (FARINEX LCF) | 3.0% (3) |
| (E) Lard | 11.9% (10) |
| (F) Water | 38.17% (32) |

Production Procedures

Powders (A), (B), (C), and (D), seasonings, spices, and water (F) were mixed for approximately 30 minutes for swelling konjac powder. In addition, (C) was allowed to act on the mixture such that a dough-like paste was prepared. Then, ginger, white scallion, carrot, and (E) were added thereto and mixed together and shaped into a spherical form with a diameter of approximately 2 to 3 cm. The product was freeze-dried with a vacuum freeze dryer. Accordingly, a substitute chicken meatball dried product was obtained. Drying conditions included a drying time of 18 hours, a cold trap temperature of −40° C. or less, a degree of vacuum of 0.1 torr or less, and a tray temperature of 50° C.

Property Evaluation

The obtained product had properties described below when cooked for reconstitution in hot water (100° C. for 10 minutes) and eaten.

Figure 12:
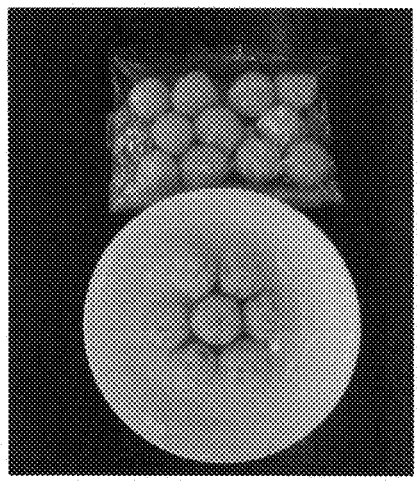
FIG. 12 is a photograph showing a substitute chicken meatball dried product (in a package) obtained in Example 14 and the product subjected to reconstitution in hot water (on a dish).

Appearance: The product was shaped into a spherical form with a diameter of 2 to 3 cm. Finely chopped vegetable was visually confirmed in the product. Thus, the product gave an appearance that was similar to the appearance of a handmade-style chicken meatball product (see FIG. 12).

Texture: The product had fibrous texture to some extent and also had chicken meatball-like texture.

The above substitute chicken meatballs (in a dried state) (weight: 100 g) contained 1.3 g of protein and 40 g of fat.

Figure 21:
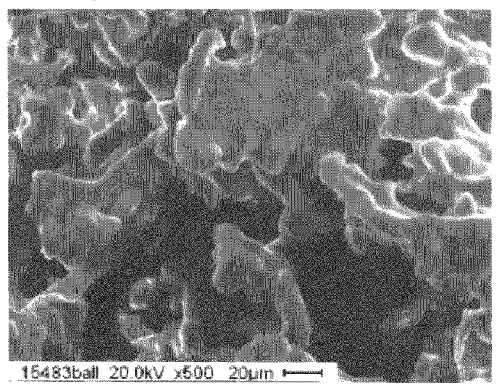
FIG. 21 is an electron microscopic observation image (500-fold magnification) of a cross section obtained by slicing a substitute chicken meatball dried product obtained in Example 14.

After reconstitution in hot water, the weight increased by approximately 3 times (to a level equivalent to the weight obtained before freeze drying). In addition FIG. 21 shows an electron microscopic observation image (500-fold magnification) of a cross section obtained by slicing the substitute chicken meatball dried product. In the image, insoluble dietary fibers are found to be covered with glucomannan. This is thought to contribute to realization of the chicken meatball-like properties described above.

Example 15

Retort Curry Containing Substitute Minced Meat

Composition

TABLE 20

| Substitute minced meat dried product obtained in Example 2 | 15 g |
|---|---|
| Curry source* | 185 g |

*Curry source containing wheat starch (ukiko) instead of wheat flour for increasing viscosity and also containing a low-protein extract Production Procedures A retort pouch was filled with the above raw materials and subjected to retort sterilization (heat treatment) at 120° C. for 25 minutes.

Property Evaluation

The obtained product had properties described below when eaten after 1 month preservation.

Appearance: The product retained a minced meat form.

Figure 13:
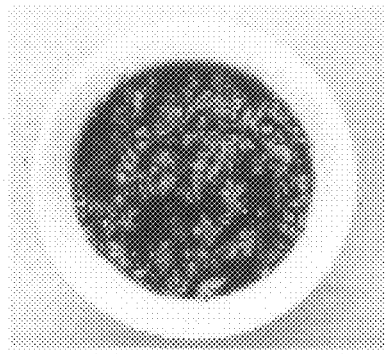
FIG. 13 is a photograph of retort curry containing substitute minced meat obtained in Example 15.

Substitute minced meat pieces were scattered in curry source. The product gave an appearance that was similar to the appearance of keema curry (see FIG. 13).

The substitute minced meat absorbed a portion of source and thus was colored yellow.

Texture: The product had hardness, elasticity, and fibrous texture that were similar to those of minced chicken meat.

Example 16

Retort Substitute Hamburger Steak

Composition

TABLE 21

| Substitute hamburger steak dried product obtained in Example 13 | 3 pieces (approximately 35 g in total) |
|---|---|
| Hamburger steak source* | 200 g |

*Hamburger steak source containing wheat starch (ukiko) instead of wheat flour for increasing viscosity and also containing a low-protein extract Production Procedures A retort pouch was filled with the above raw materials and subjected to retort sterilization (heat treatment) at 120° C. for 25 minutes.

Property Evaluation

The obtained product had properties described below when eaten after 1 month preservation.

Appearance: The product in a retort pouch retained its original form.

The product gave an appearance similar to the appearance of stewed hamburger steak. The product absorbed a portion of source and thus was colored brownish red.

Texture: The obtained product had texture similar to the texture of very soft stewed hamburger steak.

When the product was chewed, fat or oil and source oozed therefrom like meat juice.

Example 17

Soup Containing Substitute Chicken Meatballs

Composition

TABLE 22

| Substitute chicken meatball dried product obtained in Example 14 | 5 pieces (approximately 15 g in total) |
|---|---|
| Soup stock* | 200 g |

*Soup stock containing a low-protein extract

Production Procedures

A retort pouch was filled with the above raw materials and subjected to retort sterilization (heat treatment) at 120° C. for 25 minutes.

Property Evaluation

The obtained product had properties described below when eaten after 1 month preservation.

Appearance: The product in a retort pouch retained its original form.

There were no changes in the color of vegetable mixed in the product since the beginning of preservation.

Texture: The product had fibrous texture to some extent and also had chicken meatball-like texture.

When the product was chewed, fat or oil and soup stock oozed therefrom like meat juice.

Example 18

Substitute Minced Meat Frozen Product

Production Procedures

Example 18 was carried out as in Example 2 except that processed starch (FARINEX LCF) (D) was replaced by corn starch. Thus, a minced meat-like shaped product (in a pre-freeze-dried state) was obtained. The shaped product had fresh minced meat-like properties.

The shaped product was placed in a tray and frozen in a blast freezer at a freezer temperature of −40° C. The frozen product had properties similar to those of frozen fresh minced meat.

Property Evaluation

The substitute minced meat frozen product had properties described below when heat-cooked in boiling water (100° C. for 10 minutes) and eaten. Appearance: The form and the color of the product were similar to those of minced livestock meat.

Texture: The obtained product had muscle fiber-like fibrous texture particular to livestock meat, hardness, and elasticity. The product had texture softer than the product in Example 2, which had been reconstituted in hot water. The product had meat-like taste but no unusual taste or smell.

The above substitute minced meat (in a frozen state) (weight: 100 g) contained 0.1 g of protein and 15 g of fat.

Example 19

Substitute Meatball Frozen Product

Production Procedures

A shaped product (in a pre-freeze-dried state) was obtained as in Example 13 except that the mixture is shaped into a meatball-like form (10 g each) instead of a disk form. The shaped product had properties similar to those of fresh minced meatballs.

The shaped product was placed in a tray and frozen in a freezer at a freezer temperature of −20° C. The frozen product had properties similar to those of frozen meatballs.

Property Evaluation

The frozen substitute meatball product had properties described below when deep fried in oil and eaten Appearance: The product was visually confirmed to contain many pieces of cut onion. The product gave an appearance that was similar to the appearance of a handmade-style meatball product.

Texture: The product was soft and had fibrous texture. In addition, the texture of each ingredient was confirmed. The product also had texture that was similar to the texture of a handmade-style meatball product.

The above substitute meatballs (in a frozen state) (weight: 100 g) contained 0.5 g of protein and 15 g of fat.

Example 20

Retort Food Containing a Substitute Meatball Frozen Product

Production Procedures

TABLE 23

| Substitute meatball frozen product obtained in Example 19 | 50 g (5 pieces) |
|---|---|
| Chinese-style sweet vinegar source | 150 g |

Production Procedures

A retort pouch was filled with a substitute meatball frozen product and Chinese-style sweet vinegar source and subjected to retort sterilization (heat treatment) at 120° C. for 25 minutes.

Property Evaluation

The obtained product had properties described below when eaten after 1 month preservation.

Appearance: The product retained the meatball form.

In terms of appearance, the substitute meatballs were dressed with Chinese-style sweet vinegar source.

Texture: The product had hardness, elasticity, and fibrous texture that were similar to those of a livestock meatball product. The product had texture softer than the product in Example 16, which had been eaten after preservation.

Example 21

Baked Substitute Hamburger Steak Containing Livestock Meat

Production Procedures

A shaped product in a disk form (in a pre-freeze-dried state) was obtained as in Example 13 except that beef minced meat was mixed in when onion and lard (E) were added to a dough-like paste, provided that the amount of beef minced meat corresponded to 55 parts by mass relative to the total amount of raw materials excluding beef (100 parts by mass).

The above product obtained by mixing a dough-like paste and beef minced meat, etc and shaping a mixture was similar to a hamburger patty.

Property Evaluation

The obtained product had properties described below when heat-cooked with a frying pan in accordance with a method for cooking hamburger steak.

Appearance: The product gave an appearance that was similar to the appearance of usual hamburger steak.

Texture: The product had hamburger steak-like tissue and texture. The product with beef taste was tasty.

Example 22

Substitute Minced Meat Frozen Product

Production Procedures

A shaped product (before being heated in boiling water) was obtained by extrusion using a mincer as in Example 1. The shaped product was steamed at 100° C. for 10 minutes, followed by cooling to room temperature. Then, the resulting product was frozen in a freezer at a freezer temperature of −20° C.

Property Evaluation

The substitute minced meat frozen product had properties described below when heat-cooked in boiling water (100° C. for 10 minutes) and eaten.

Appearance: The form and the color of the product were similar to those of minced livestock meat.

Texture: The product had muscle fiber-like fibrous texture particular to livestock meat and softness.

The product had no unusual taste or smell.

The above substitute minced meat (weight: 100 g) contained 0.1 g of protein.

Example 23

Other Mixing Method

Samples were separately produced and evaluated as in Examples 1 to 22 and Comparative Examples 1 to 5. However, a step of promoting swelling of glucomannan and an action of alkaline coagulant by stirring a mixture of predetermined raw materials for 5 minutes and allowing the mixture to stand for approximately 30 minutes was carried out instead of the step of promoting swelling of glucomannan and an action of alkaline coagulant by mixing predetermined raw materials for approximately 30 minutes (Examples 1 to 22 and Comparative Examples 1 to 5). Accordingly, the results similar to those obtained in Examples 1 to 22 and Comparative Examples 1 to 5 were obtained.

What is claimed is:

1. A substitute meat food composition, which is prepared with a mixture containing:
   a konjac raw material in a hydrated and swollen state,
   further water-insoluble dietary fibers in an amount corresponding to 6 to 17 parts based on dry weight relative to 1 part based on dry weight of glucomannan in the konjac raw material, and
   an alkaline coagulant,
   wherein the konjac raw material forms a gel in the mixture, and
   the gelling is completed after formation of the mixture.

2. The substitute meat composition according to claim 1, in which the mixture further contains starch.

3. The substitute meat composition according to claim 1, in which the mixture further contains fat or oil.

4. The substitute meat composition according to claim 1, which is shaped into a particle form, spherical form, string form, or plate form.

5. The substitute meat composition according to claim 1, in which the protein content is 10 g or less per 100 g.

6. A food for kidney disease patients, which contains the substitute meat food composition according to claim 1.

7. The substitute meat food composition according to claim 1, wherein the further water-insoluble dietary fibers are highly purified fibers and selected from the group consisting of a cellulose powder, a powder comprising a complex of crystalline cellulose and a thickener, and a mixture thereof.

8. The substitute meat food composition according to claim 1, in which the mixture contains water in an amount corresponding to 10 to 1000 parts by weight relative to 1 part based on dry weight of glucomannan in the konjac raw material.

9. The substitute meat food composition according to claim 8, wherein the mixture contains water in an amount corresponding to 20 to 600 parts by weight relative to 1 part based on dry weight of glucomannan in the konjac raw material.

10. The substitute meat composition according to claim 1, which is prepared by heating the mixture, freezing the mixture, drying the mixture, or treating the mixture with at least two of the ways of treating the mixture described above.

11. The substitute meat composition according to claim 10, which is prepared by drying the mixture and reconstituting the obtained dried product with water.

12. The substitute meat composition according to claim 11, in which the protein content is 10 g or less per 100 g.

13. A food for kidney disease patients, which contains the substitute meat food composition according to claim 11.

14. A method for producing a substitute meat food composition, comprising the step of forming a mixture containing (a) a konjac raw material in a hydrated and swollen state, (b) further water-insoluble dietary fibers in an amount corresponding to 6 to 17 parts based on dry weight relative to 1 part by weight based on dry weight of glucomannan in the konjac raw material, and (c) an alkaline coagulant, and the step of gelling the konjac raw material in a hydrated and swollen state in the mixture.

15. The method according to claim 14, wherein the mixture contains water in an amount corresponding to 10 to 1000 parts by weight relative to 1 part by weight based on dry weight of glucomannan in the konjac raw material.

16. The method according to claim 15, wherein the mixture contains water in an amount corresponding to 20 to 600 parts by weight relative to 1 part based on dry weight of glucomannan in the konjac raw material.

17. The method according to claim 14, further comprising the step of shaping the substitute meat food composition into a particle form, spherical form, string form, or plate form.

18. The method according to claim 14, further comprising at least one step selected from among the step of heating the mixture, the step of freezing the mixture, and the step of drying the mixture.

19. The substitute meat food composition according to claim 14, wherein the further water-insoluble dietary fibers are highly purified fibers and selected from the group consisting of a cellulose powder, a powder comprising a complex of crystalline cellulose and a thickener, and a mixture thereof.

20. The method according to claim 15, comprising the step of drying the mixture and further comprising the step of reconstituting the dried product obtained in the previous step with water.

21. The method according to claim 20, wherein the step of reconstitution with water is a step of immersing the dried product in warm water, a step of boiling the dried product in water, or a step of steaming the dried product with water vapor.

* * * * *